Patented Nov. 18, 1952

2,618,614

UNITED STATES PATENT OFFICE 2,618,614

PREPARATION OF A COPPER-CONTAINING PHOSPHORIC ACID CATALYST

Mitchell S. Bielawski, Berwyn, and Julian M. Mavity, Hinsdale, Ill., assignors to Universal Oil Products Company, Chicago, Ill., a corporation of Delaware No Drawing. Application April 12, 1949, Serial No. 87,131

11 Claims. (Cl. 252—435)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and a copper compound selected from the members of the group consisting of an oxide, a hydroxide, and a salt, drying and calcining the resultant mixture.

Another embodiment of this invention relates to a process for manufacturing a solid catalyst which comprises mixing a phosphoric acid, a siliceous adsorbent, and a copper salt, drying and calcining the resultant mixture.

A further embodiment of this invention relates to a process for manufacturing a solid catalyst which comprises mixing a phosphoric acid, a siliceous adsorbent, and a copper sulfide, drying and calcining the resultant mixture.

An additional embodiment of this invention relates to a process for manufacturing a solid catalyst which comprises mixing a phosphoric acid, diatomaceous earth, and a copper halide to form a composite, drying and calcining said composite.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, ortho-phosphoric acid ($H_3PO_4$) and pyrophosphoric acid ($H_4P_2O_7$) find general application in the primary mixtures, due mainly to their cheapness and to the readiness with which they may be procured, although the invention is not restricted to their use but may employ any of the other acids of phosphorus insofar as they are adaptable. It is not intended to infer, however, that the different acids of phosphorus, which may be employed will produce catalysts which have identical effects upon any given organic reactions as each of the catalysts produced from different acids and by slightly varied procedure will exert its own characteristic action.

In using ortho-phosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the ortho phosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is employed.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing ortho-phosphoric, pyro-phosphoric, tri-phosphoric, and other polyphosphoric acids.

Another acid of phosphorus which may be employed in the manufacture of composite catalysts according to the present invention is tetra-phosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetra-phosphoric acid may be manufactured by the gradual and controlled dehydration by heating of ortho-phosphoric acid or pyro-phosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetra-phosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalyst inasmuch as the crude tetraphosphoric acid mixture may be incorporated with the siliceous adsorbent and other catalyst ingredient.

The materials which may be employed as adsorbents or carriers for acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

Catalysts may be prepared from an acid of phosphorus such as ortho-phosphoric acid, pyrophosphoric acid, tri-phosphoric acid, or tetra-phosphoric acid, and a siliceous adsorbent containing a copper compound selected from the members of the group consisting of an oxide, a hydroxide, and a salt, the latter including particularly a carbonate, a sulfide, and a halide, such as chloride or bromide. Some of these copper salts when mixed with a phosphoric acid form copper acid phosphates and liberate a volatile acid or its anhydride as carbon dioxide, hydrogen sulfide, a hydrogen halide, and the like. These mentioned starting materials used in this catalyst preparation process are subjected to the successive steps of mixing the copper compound with the siliceous adsorbent, and thereafter mixing the phosphoric acid with the finely divided relatively inert carrier containing the copper compound and generally maintained at a temperature of from about 50° to about 450° F. to form a rather wet paste, the acid ordinarily being in major proportion by weight. Also the copper compound may be added first to the phosphoric acid or the catalyst ingredients may be mixed in any desired order.

The resultant wet paste formed from the phosphoric acid, siliceous adsorbent, and copper compound is then formed into shaped particles, by extrusion or other suitable means and the resultant particles are then dried at a temperature of from about 200° to about 500° F. to form a substantially solid material which is then calcined further at a temperature generally of from about 500° to about 1000° F. for a time of from about 0.25 to about 10 hours. The calcining may be carried out by heating in a substantially inert gas, such as air, nitrogen, and the like.

The resultant catalyst which has been calcined is active for polymerizing olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase and they may be employed, in suspension, also in liquid phase in various types of equipment.

With suitable modifications in the details of operation, the present type of catalyst may be employed in a large number of organic reactions, including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc. Reactions involving the hydro-halogenation of unsaturated organic compounds, isomerization reactions, ester formation by the interaction of carboxylic acids and olefins, and the like. The specific procedure for utilizing the present type of catalyst in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. We have found, however, that catalysts of high crushing strength may be produced by adding to the composite of phosphoric acid and diatomaceous earth a relatively small amount of a copper oxide, hydroxide, or salt which is generally added in an amount of not more than 10% and preferably from about 0.5 to about 5% by weight of the catalyst mixture. Such a catalyst containing a copper compound also has a good crushing strength after it has been used in the polymerization reaction. Pyrophosphoric acid-diatomaceous earth catalysts to which the above indicated amounts of a copper compound have been added and then the resultant composite has been dried and calcined, have been found to produce catalysts having a high crushing strength, said strength being much higher than that of similar catalyst material prepared in the absence of the added copper compound. These catalysts have then been tested in converting propylene into propylene polymers in rotatable steel autoclaves and have been found to retain this high crushing strength after such polymerization use in which from 26 to 70% of the propylene charged is converted into liquid products.

The following examples of the preparation of catalysts comprised within the scope of this invention and the results obtained in their use for catalyzing the polymerization of propylene are characteristic, although the exact details set forth in these examples are not to be construed as imposing undue limitation upon the generally broad scope of the invention.

The table shows comparative results obtained in autoclave tests on phosphoric acid-diatomaceous earth catalysts containing various amounts of certain copper compounds. These catalyst activity tests were carried out by placing 10 grams of 5 x 5 mm. pellets of the catalyst and 100 grams of propane-propylene mixture (50–55% propylene content) in a rotatable steel autoclave of 850 cc. capacity rotated at a temperature of 450° F. for 2 hours. At the end of this time, determinations were made to indicate the percentage conversion of propylene into liquid polymers.

TABLE

*Olefin polymerization activity and crushing strength results obtained on catalysts prepared from phosphoric acid, a siliceous adsorbent and a copper compound*

Test Conditions: 10 grams Catalyst, 100 grams propane-propylene feed (52–55 mole percent $C_3H_6$) two hours at 450° F. (232° C.) in 850 cc. rotating autoclave.

| Run No. | Material added to mixture of phosphoric acid and diatomaceous earth | Calcination | | ABD[1] g./cc. | Percent Conv. of $C_3H_6$ | Crushing strength, lbs. | |
|---|---|---|---|---|---|---|---|
| | | ° F. | Hrs. | | | Before use | After use |
| 1 [a] | None | (2) | (2) | | 66 | 11.4 | 5.4 |
| 2 [a] | do | 860 | 1 | | 48 | 16.0 | 9.1 |
| 3 [b] | 3.1% Cupric oxide | 500 | 1 | | 32 | 18.2 | 16.4 |
| 4 [b] | do | 860 | 1 | | 47 | 24.7 | 17.3 |
| 5 [b] | 2.8% Cuprous oxide | 860 | 1 | | 65 | 24.3+ | 23.8+ |
| 6 [a] | 2.9% Cuprous oxide | 680 | 1 | 0.783 | 64 | 26.6+ | 13.4+ |
| 7 [a] | do | 860 | 1 | 0.771 | 68 | 26.3+ | 25.2+ |
| 8 [b] | do | 680 | 1 | 0.770 | 54 | 26.7+ | 13.9 |
| 9 [b] | do | 860 | 1 | 0.752 | 68 | 26.9+ | 25.9+ |
| 10 [a] | 3.9% Cupric sulfide | 860 | 1 | 0.732 | 70 | 27+ | 22.8+ |
| 11 [a] | do | 950 | 1 | 0.733 | 26 | 26.5+ | 26.8+ |

[1] Apparent bulk density.
[2] Commercial.
[a] Extruded, 5 x 5 mm.
[b] Molded, 5 x 5 mm.

Outstanding among these catalysts containing copper compounds are those prepared by adding cuprous oxide and cupric oxide to the mixture of phosphoric acid and diatomaceous earth after which the mixture of these three ingredients was calcined at temperatures of 500° and 860° F. for one hour. These catalysts converted 32 to 68% of the propylene into liquid products in the autoclave test and retained after use crushing strengths of from 13 to 26 pounds. As a further comparison, commercial solid phosphoric acid catalyst prepared from diatomaceous earth and pyrophosphoric acid but containing no added copper compound gave a propylene conversion of 66% in the autoclave test but showed an after use crushing strength of only 5.4 pounds. Similarly, a diatomaceous earth-phosphoric acid catalyst similar to the aforementioned but after an additional calcination of one hour at a temperature of 860° F. gave a propylene conversion of 48% and retained an after use crushing strength of 9.1 pounds which was considerably lower than the initial crushing strength of 16.0 pounds.

Preparation of the catalysts containing the mentioned copper compounds are described as follows:

The catalyst used in Runs 3 and 4 was prepared by forming an intimate mixture of 43.8 grams of kieselguhr, 6.3 grams of cupric oxide, and making a paste by mixing these powdered materials with 178.7 grams of 85% orthophosphoric acid. The paste was heated in an evaporating dish on a water bath while being heated on the surface of the paste with a heat lamp until sufficiently dry for pressing into a steel plate of 5 mm. thickness containing a plurality of holes, each 5 mm. in diameter. This mold plate, filled with the paste-like catalyst material, was dried in an oven for 30 minutes at a temperature of 392° F., the pills were then pressed from the plate and dried for an additional 30 minutes at the same temperature and then calcined for one hour at 500° F. The calculated composition of this catalyst composite corresponded to 21.7% by weight diatomaceous earth, 75.2% ortho-phosphoric acid, and 3.1% of cupric oxide.

The catalyst used in Run 4 was similar to that of Run 3 but with additional calcination for one hour at a temperature of 860° F. The catalyst used in Run 5 was prepared from 4.3 grams of cuprous oxide, 133.3 grams of 85% ortho-phosphoric acid and 32.8 grams of diatomaceous earth. In preparing this composition, the cuprous oxide was first thoroughly dispersed in the ortho-phosphoric acid and then the diatomaceous earth was worked in, a small portion at a time, to form a plastic-like composite, which was then dried in air under a heat lamp until it reached a consistency satisfactory for pressing into pill molds to form 5 x 5 mm. pellets. These pellets were then dried 30 minutes at 392° F. in the pill plate, and dried an additional 30 minutes at the same temperature. After a preliminary calcination at a temperature of 500° F., for one hour, the pills were finally calcined for one hour at a temperature of 860° F. to form pellets with an approximate bulk density of 0.75 and an average crushing strength of 24 pounds. The composition of these catalyst pellets corresponded to 2.8% cuprous oxide, 21.8% diatomaceous earth, and 75.4% of ortho-phosphoric acid, so that the 2.5% of copper and the phosphoric acid to diatomaceous earth ratio of 3.465 are the same as in the catalyst prepared from cupric oxide, phosphoric acid and diatomaceous earth and used in Runs 3 and 4.

For the catalysts used in Runs 6 to 9 inclusive, it was intended to duplicate the composition of that used in Run 5. The latter catalysts were prepared by forming an intimate mixture of 4.3 grams of cuprous oxide, 32.8 grams of diatomaceous earth, and 132.2 grams of phosphoric acid (85.3% orthophosphoric acid) and heating under a heat lamp until the consistency of the resultant composite was suitable for forming into pills. The composite was divided into two parts and one part extruded while the other was pilled by means of the mold plate mentioned above. These pills, all being in the form of 5 x 5 mm. pellets, were then dried for one hour at a temperature of 392° F. and then further calcined for one hour, part at 630° F. and the other part at 860° F., as indicated in the table.

An intimate mixture of 3.8 grams of cupric sulfide, 21.8 grams of diatomaceous earth and 88 grams of orthophosphoric acid of 85.8% H₃PO₄ concentration was heated under a heat lamp until the consistency of the composited material was suitable for extrusion. The extruded strands of 5 mm. diameter were then cut into 5 mm. lengths to form pellets or pills. The resulting pills were then given a preliminary drying for one hour at a temperature of 392° F. and afterwards calcined in a slow steam of nitrogen for one hour at 860° F. and another portion at 950° F. as indicated in the table.

We claim as our invention:

1. A process for manufacturing a solid catalyst which comprises mixing at least about 50% by weight of a phosphoric acid, a siliceous adsorbent, and not more than approximately 10% by weight of a copper compound selected from the members of the group consisting of an oxide, a hydroxide, and a salt, pelleting the resultant mixture and calcining the pellets at a temperature of from about 500° to about 1000° F.

2. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a copper oxide, pelleting the resultant mixture, and calcining the pellets at a temperature of from about 500° to about 1000° F.

3. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a copper salt, pelleting the resultant mixture, and calcining the pellets at a temperature of from about 500° to about 1000° F.

4. A process for manufacturing a solid catalyst which comprises mixing from about 50 to about 75% by weight of a phosphoric acid, from about 15 to about 49.5% by weight of a siliceous adsorbent and from about 0.5 to about 10% by weight of copper sulfide, pelleting the resultant mixture, and calcining the pellets at a temperature of from about 500° to about 1000° F.

5. A process for manufacturing a solid catalyst which comprises mixing from about 50 to about 75% by weight of a phosphoric acid, from about 15 to about 49.5% by weight of diatomaceous earth, and from about 0.5 to about 10% by weight of a copper halide to form a composite, pelleting said composite, and calcining the pellets at a temperature of from about 500° to about 1000° F.

6. A process for manufacturing a solid catalyst which comprises mixing from about 50 to about 75% by weight of a polyphosphoric acid, from about 15 to about 49.5% by weight of a siliceous adsorbent, and from about 0.5 to about 10% by weight of a copper compound selected from the members of the group consisting of an oxide, a hydroxide, and a salt, pelleting the resultant mixture, and calcining the pellets at a temperature of from about 500° to about 1000° F.

7. A process for manufacturing a solid catalyst which comprises mixing from about 50 to about 75% by weight of pyrophosphoric acid, from about 15 to about 49.5% by weight of a siliceous adsorbent, and from about 0.5 to about 10% by weight of a copper compound selected from the members of the group consisting of an oxide, a hydroxide, and a salt, pelleting the resultant mixture, and calcining the pellets at a temperature of from about 500° to about 1000° F.

8. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a copper compound selected from the members of the group consisting of an oxide, a hydroxide, and a salt to form a composite, pelleting said composite, and calcining the pellets at a temperature of from about 500° to about 1000° F.

9. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a copper compound selected from the members of the group consisting of an oxide, a hydroxide, and a salt at a temperature of from about 50° to about 450° F. to form a composite, pelleting said composite, drying the resultant pellets at a temperature of from about 200° to about 500° F., and calcining the dried pellets at a temperature of from about 500° to about 1000° F. for a time of from about 0.25 to about 10 hours.

10. A process for manufacturing a solid catalyst which comprises mixing from about 50 to about 75% by weight of a polyphosphoric acid, from about 15 to about 49.5% by weight of diatomaceous earth, and from about 0.5 to about 10% by weight of a copper oxide at a temperature of from about 50° to about 450° F. to form a composite, pelleting said composite, drying the resultant pellets at a temperature of from about 200° to about 500° F., and calcining the dried pellets at a temperature of from about 500° to about 1000° F. for a time of from about 0.25 to about 10 hours.

11. A process for manufacturing a solid catalyst which comprises a mixing from about 50 to about 75% by weight of a polyphosphoric acid, from about 15 to about 49.5% by weight of diatomaceous earth, and from about 0.5 to about 10% by weight of a copper sulfide at a temperature of from about 50° to about 450° F. to form a composite, pelleting said composite, drying the resultant pellets at a temperature of from about 200° to about 500° F., and calcining the dried pellets at a temperature of from about 500° to about 1000° F. for a time of from about 0.25 to about 10 hours.

MITCHELL S. BIELAWSKI.
JULIAN M. MAVITY.

REFERENCES CITED

The following references are of record in the file of this patent:

UNITED STATES PATENTS

| Number | Name | Date |
| --- | --- | --- |
| 2,060,871 | Ipatieff | Nov. 17, 1936 |
| 2,120,702 | Ipatieff et al. | June 14, 1938 |
| 2,120,723 | Watson | June 14, 1938 |
| 2,210,148 | Indest | Aug. 6, 1940 |
| 2,212,995 | Wassermann | Aug. 27, 1940 |
| 2,231,452 | Morrell | Feb. 11, 1941 |
| 2,275,182 | Ipatieff et al. | Mar. 3, 1942 |
| 2,300,123 | Keunecke et al. | Oct. 27, 1942 |
| 2,425,493 | Stapleton | Aug. 12, 1943 |
| 2,446,619 | Stewart et al. | Aug. 10, 1948 |
| 2,447,599 | Schmerling | Aug. 24, 1948 |